UNITED STATES PATENT OFFICE.

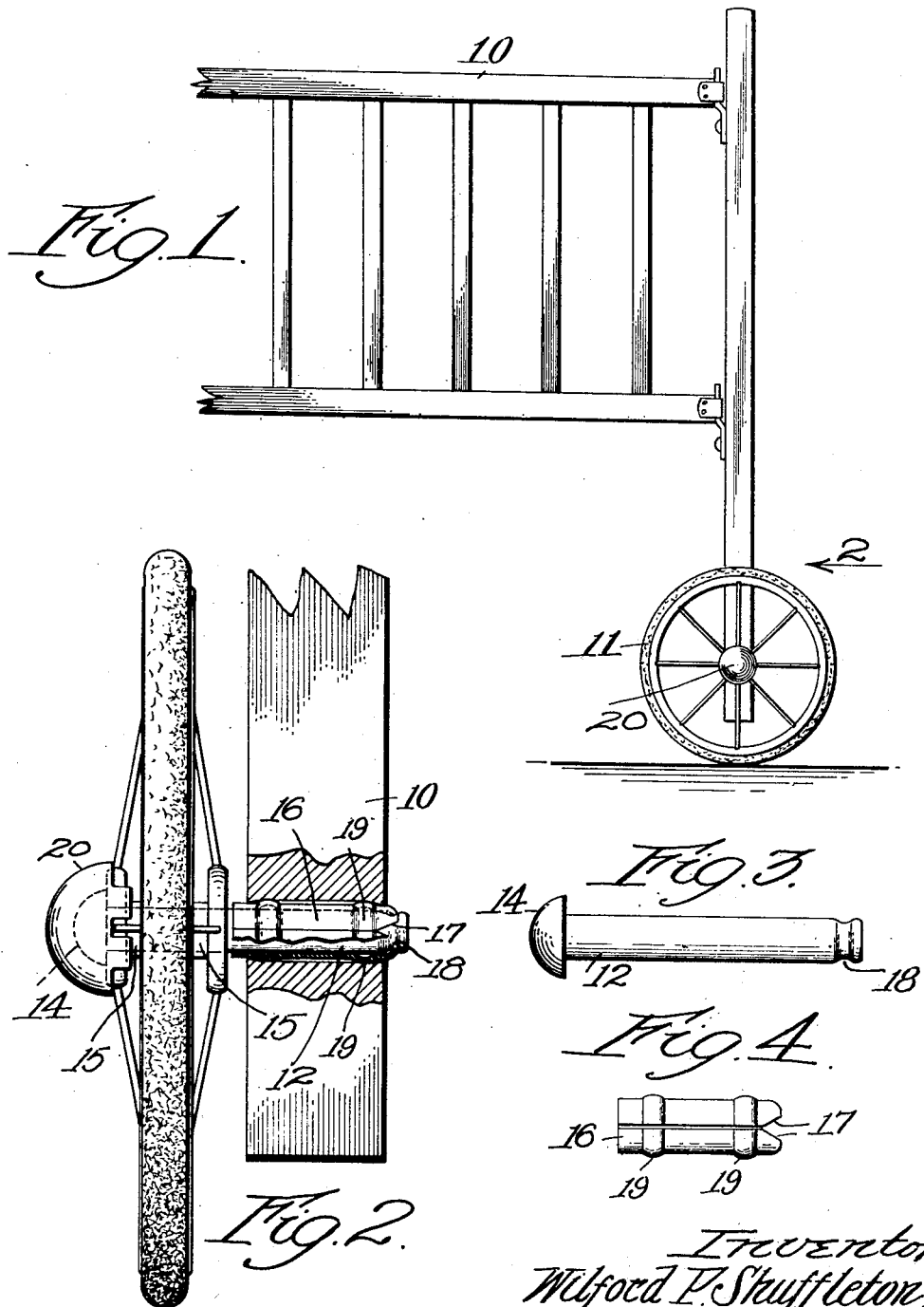

WILFORD P. SHUFFLETON, OF GARDNER, MASSACHUSETTS, ASSIGNOR TO GEM CRIB & CRADLE COMPANY, OF GARDNER, MASSACHUSETTS, A CORPORATION OF MASSACHUSETTS.

WHEEL CONNECTION FOR BASSINETS.

1,370,611.    Specification of Letters Patent.    Patented Mar. 8, 1921.

Application filed July 30, 1919. Serial No. 314,200.

*To all whom it may concern:*

Be it known that I, WILFORD P SHUFFLETON, a citizen of the United States, residing at Gardner, in the county of Worcester and State of Massachusetts, have invented a new and useful Wheel Connection for Bassinets, of which the following is a specification.

This invention relates to a method of applying wheels to bassinets and other articles of similar character.

The principal objects thereof are to provide a construction which will avoid the usual continuous shaft extending between the two opposite legs of the bassinet by means of a simple short shaft connection individually mounted on each leg for carrying the wheel; to provide a simple means for detachably mounting the shaft on the leg; and to provide a construction in which the wheel turns on the shaft and the shaft also is capable of turning freely in the passage through the leg so as to avoid binding of the wheel and thus secure free rotation thereof under all conditions.

Other objects and advantages of the invention will appear below.

Reference is to be had to the accompanying drawings in which—

Figure 1 is a side view of a part of the bassinet showing a preferred embodiment of this invention applied thereto.

Fig. 2 is a front view on a large scale, partly in section.

Fig. 3 is an elevation of the shaft.

Fig. 4 is a similar view of the means for detachably holding the shaft in position.

This invention is shown as applied to a bassinet 10 having four wheels, one of which 11 is shown. Heretofore, two of these legs opposite each other have been provided with a shaft extending through from one to the other for carrying the wheels, but I provide each leg with a short shaft or stud 12, one end of which is mounted in the leg and the other end carries the wheel 11. This end is provided with an integral head 14 and the wheel shown is metallic having a common sheet metal cylindrical bearing 15 which freely rotates on the shaft near this head.

The other end of the shaft or stud passes into a sheet metal bushing 16 which is slit down one side throughout its length and is provided with circular enlargements 19 which hold it in position when it is driven into the wood. It is also provided with opposite notches 17 in its outer end. These notches are to provide resiliency and allow the free ends between them to yield so that they will open slightly so as to enter a groove 18 in the end of the shaft or stud. This groove is shown preferably as circumferential; it will be understood, of course, that other means of detachably connecting these parts can be used according to this invention.

In the use of the device, the wheel is put on the stud and brought up next to the head and then the stud is driven into the bushing until the inturned ends engage in the groove 18. This forms a convenient and simple means for assembling the parts and eliminates the use of detachable elements such as cotter pins or the like, although they can be used with the other parts of the invention if desired. After the parts are assembled in this way, a metal cap 20 is attached to the spokes of the wheel so as to conceal the head 14 and limit its motion. Thus, the wheel is held in place on the stud and has no tendency to pull the stud out of the leg.

If it is desired to detach it, the end of the stud projecting through the side of the leg, is given a blow which will spread the end of the bushing, releasing it from its connection therewith.

It is to be observed that the bushing is the same diameter as the sheet metal hub of the wheel. In this way an extremely simple and inexpensive construction is provided which has no loose parts, and which is not likely to get out of order.

Although I have described and illustrated only a single form of the invention, I am aware of the fact that many modifications can be made therein without departing from the scope of the invention as expressed in the claims. Therefore, I do not wish to be limited to all the details of construction herein shown and described, but what I do claim is:—

1. A rolling support for a bassinet leg having a cylindrical passage therethrough, comprising a short shaft freely rotatable in said passage and having one end projecting a short distance through the leg, readily detachable means for connecting it with the leg, a head on the other end of the shaft projecting from the leg a longer distance, and a wheel freely rotatable on the shaft between the leg and said head.

2. The combination with a leg having a passage therethrough, of a bushing fixed in it, said bushing having a yielding resilient end, a shaft freely rotatable in said bushing and having means at its end for detachably connecting it with the yielding end of the bushing, and a wheel on the other end of the shaft and on the other side of the leg.

3. The combination of a leg having a passage therethrough, with a bushing fixed in it, said bushing projecting through the leg at one end and having a yielding resilient end, a shaft freely rotatable in said bushing and having means at its end for detachably connecting it with the yielding end of the bushing, and a wheel on the other end of the shaft and on the other side of the leg said wheel having a sheet metal hub of substantially the same diameter as said bushing and adapted to engage the end of said bushing.

4. The combination with a member having a cylindrical passage therethrough and a sheet metal bushing in said passage slit throughout its length and having its end drawn inwardly and provided with opposite longitudinal notches to give resiliency thereto, of a short shaft freely rotatable in said bushing and having one end provided with a groove for connecting it with the bushing and having a head on the other end, and a wheel freely rotatable on the shaft between the member and said head, said shaft having a groove entirely around it at the end, the end of the bushing extending into said groove so as to constitute a detachable fastening device.

In testimony whereof I have hereunto affixed my signature.

WILFORD P. SHUFFLETON.